United States Patent
Ellis et al.

(10) Patent No.: US 6,256,687 B1
(45) Date of Patent: *Jul. 3, 2001

(54) MANAGING DATA FLOW BETWEEN A SERIAL BUS DEVICE AND A PARALLEL PORT

(75) Inventors: David G. Ellis; Gene A. Frederiksen, both of Hillsboro; Peter B. Bloch, Portland, all of OR (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/128,956

(22) Filed: Aug. 4, 1998

(51) Int. Cl.[7] .................................................. G06F 12/00
(52) U.S. Cl. ............................................. 710/71; 710/53
(58) Field of Search ........................ 710/8, 9, 29, 58, 710/60, 62–66, 71, 105, 126, 128, 129, 53

(56) References Cited

U.S. PATENT DOCUMENTS

| | | | |
|---|---|---|---|
| 4,446,344 | * 5/1984 | Fiedler ............................ 200/83 B |
| 5,134,702 | * 7/1992 | Charych et al. ...................... 710/71 |
| 5,241,660 | * 8/1993 | Michael et al. . | |
| 5,440,694 | * 8/1995 | Nakajima ............................ 710/53 |
| 5,475,831 | * 12/1995 | Yoshida et al. ...................... 710/71 |
| 5,561,826 | * 10/1996 | Davies et al. ....................... 710/71 |
| 5,574,949 | * 11/1996 | Tsurumi .............................. 710/30 |
| 5,596,724 | * 1/1997 | Mullins et al. ..................... 710/128 |
| 5,710,800 | * 1/1998 | Ito ................................. 375/370 |
| 5,717,948 | * 2/1998 | Michalina ............................. 710/1 |
| 5,812,881 | * 9/1998 | Ku et al. ........................... 710/71 |
| 5,832,310 | * 11/1998 | Morrissey et al. .................... 710/71 |
| 5,862,367 | * 1/1999 | Chiao-Yen .......................... 710/71 |
| 5,907,719 | * 5/1999 | Nimishakavi ........................ 710/71 |
| 5,958,027 | * 9/1999 | Gulick .............................. 710/52 |
| 5,978,870 | * 11/1999 | Warren .............................. 710/71 |
| 5,999,999 | * 12/1999 | Homitsu et al. .................... 710/127 |
| 6,044,416 | * 3/2000 | Hasan .............................. 710/52 |
| 6,058,439 | * 5/2000 | Devereux ........................... 710/52 |
| 6,088,744 | * 7/2000 | Hill ................................ 710/53 |

OTHER PUBLICATIONS

Electronic Design, "Interface Chip Supplies Universal Serial Bus to Parallel–Port Conversion", pp. 102, Feb. 17, 1997.*

* cited by examiner

Primary Examiner—David A. Wiley
(74) Attorney, Agent, or Firm—Blakely, Sokoloff, Taylor & Zafman LLP

(57) ABSTRACT

The present invention is directed to a method and apparatus for managing data flow between a serial bus device which operates at a first data rate and a parallel port device which operates at a second data rate. A serial bus receiver receives data from the serial bus device at the first data rate. A buffer unit is coupled to the serial bus receiver and the parallel port device. The buffer unit stores the received data at the first data rate and transfers the stored data to the parallel port device at the second data rate.

29 Claims, 13 Drawing Sheets

| REGISTER | ADDRESS OFFSET | BIT 7 | BIT 6 | BIT 5 | BIT 4 | BIT 3 | BIT 2 | BIT 1 | BIT 0 |
|---|---|---|---|---|---|---|---|---|---|
| PID REG | 0x00 | PID2(3) | PID2(2) | PID2(1) | PID2(0) | PID1(3) | PID1(2) | PID1(1) | PID1(0) |
| ADR REG | 0x01 | EP12 | ADR(6) | ADR(5) | ADR(4) | ADR(3) | ADR(2) | ADR(1) | ADR(0) |
| ENDP REG | 0x02 | ENDP2(3) | ENDP2(2) | ENDP2(1) | ENDP2(0) | ENDP1(3) | ENDP1(2) | ENDP1(1) | ENDP1(0) |
| STAT REG | 0x03 | drfifocnt | ep2full | ep1full | ep0full | bitdr_en | gen_sof | nak_rcvd | stall_rcvd |
| PKTSZ0 REG | 0x04 | packetsize(7) | packetsize(6) | packetsize(5) | packetsize(4) | packetsize(3) | packetsize(2) | packetsize(1) | packetsize(0) |
| PKTSZ1 REG | 0x05 | NU | NU | NU | NU | NU | NU | packetsize(9) | packetsize(8) |
| EP0 DATA | 0x06 | | | | | | | | |
| EP1 DATA | 0x07 | | | | | | | | |
| EP2 DATA | 0x08 | | | | | | | | |
| SOF_CNT0 | 0x09 | sofcnt(7) | sofcnt(6) | sofcnt(5) | sofcnt(4) | sofcnt(3) | sofcnt(2) | sofcnt(1) | sofcnt(0) |
| SOF_CNT1 | 0x0A | NU | startcnt | sofcnt(13) | sofcnt(12) | sofcnt(11) | sofcnt(10) | sofcnt(9) | sofcnt(8) |

NU = not used

*FIG. 9*

MANAGING DATA FLOW BETWEEN A SERIAL BUS DEVICE AND A PARALLEL PORT

BACKGROUND OF THE INVENTION

1. Field of the Invention

This invention relates to microprocessor systems. In particular, the invention relates to the management of data flow between a serial bus device and a parallel port.

2. Description of Related Art

Many serial buses are now available for interfacing peripheral devices to a computer system. Examples of these buses include the Universal Serial Bus (USB) and the Institute of Electrical and Electronics Engineers (IEEE) 1394 standard bus. These serial buses provide a simple method of attaching and accessing peripheral devices.

For example, the USB is a new standard that complements the traditional interfaces via the microprocessor bus such as the Peripheral Component Interconnect (PCI), Industry Standard Architecture (ISA), or Enhanced Industry Standard Architecture (EISA) buses. Advantages of the USB include plug and play support, hot attachment, expandability, legacy hardware and software support, and low cost.

A USB-based system typically includes one or more USB clients, a USB host controller, one or more hubs, and several USB devices. Examples of USB devices are USB-compatible digital cameras, printers, keyboards, scanners, modems, and digital phones. All USB devices attach directly to a USB controller or via a USB hub that provides one or more ports. USB supports two different speeds: 1.5 Mega bits (Mbits) per second for low-speed devices and 12 Mbits/second for high-speed devices.

The transfer types supported by the USB include isochronous transfers, bulk transfers, interrupt transfers, and control transfers. USB communication is based on transferring data at regular intervals of 1 millisecond (ms). Each interval is referred to as a frame. Each USB function is designed with a collection of registers, or endpoints, used by the client driver when accessing its function. An endpoint, or a device endpoint, is a uniquely identifiable portion of a USB device that is the source or sink of information in a communication flow between the host and device.

An interrupt transfer is used for devices that are typically interrupt driven devices in legacy personal computer (PC) implementations. A bulk transfer is used for transferring large blocks of data that have no periodic or transfer rate requirement (e.g., large print job).

An isochronous transfer requires a constant delivery rate. Applications that use isochronous transfers should ensure that rate matching between the sender and receiver can be accomplished. A control transfer is used to transfer specific requests to USB devices and is most commonly used during device configuration.

Although these serial buses have become standards endorsed by the industry such as the computer industry, not all systems or platforms provide the serial bus interface directly. A PC system without a serial bus interface therefore has problems communicating with a serial bus device.

Therefore there is a need in the technology to provide an efficient method and apparatus to provide a communication interface between a serial bus device and a non-serial bus enabled computer.

SUMMARY OF THE INVENTION

The present invention is directed to a method and apparatus for managing data flow between a serial bus device which operates at a first data rate and a parallel port device which operates at a second data rate. A serial bus receiver receives data from the serial bus device at the first data rate. A buffer unit is coupled to the serial bus receiver and the parallel port device. The buffer unit stores the received data at the first data rate and transfers the stored data to the parallel port device at the second data rate.

BRIEF DESCRIPTION OF THE DRAWINGS

The features and advantages of the present invention will become apparent from the following detailed description of the present invention in which:

FIG. 9 is a diagram illustrating a memory map for the registers according to one embodiment of the invention.

DESCRIPTION OF THE PRESENT INVENTION

The present invention is directed to a method and apparatus for managing data flow between a serial bus device and a parallel port. The method utilizes a double-buffered first-in-first-out (FIFO) queues to receive data from the serial bus device to the parallel port. An addressing mechanism keeps track of the state of the FIFO's.

In the following description, for purposes of explanation, numerous details are set forth in order to provide a thorough understanding of the present invention. However, it will be apparent to one skilled in the art that these specific details are not required in order to practice the present invention. In other instances, well known electrical structures and circuits are shown in block diagram form in order not to obscure the present invention. In particular, the present invention discloses an interface circuit between a serial bus device and a non-serial bus enabled PC via a parallel port device. The serial bus is applicable to any serial bus having attached peripheral device. Therefore, although following description refers to the USB as a specific example, it is understood that the present invention can also be practiced with other serial buses, e.g., the IEEE-1394 bus, as well.

Figure 1:
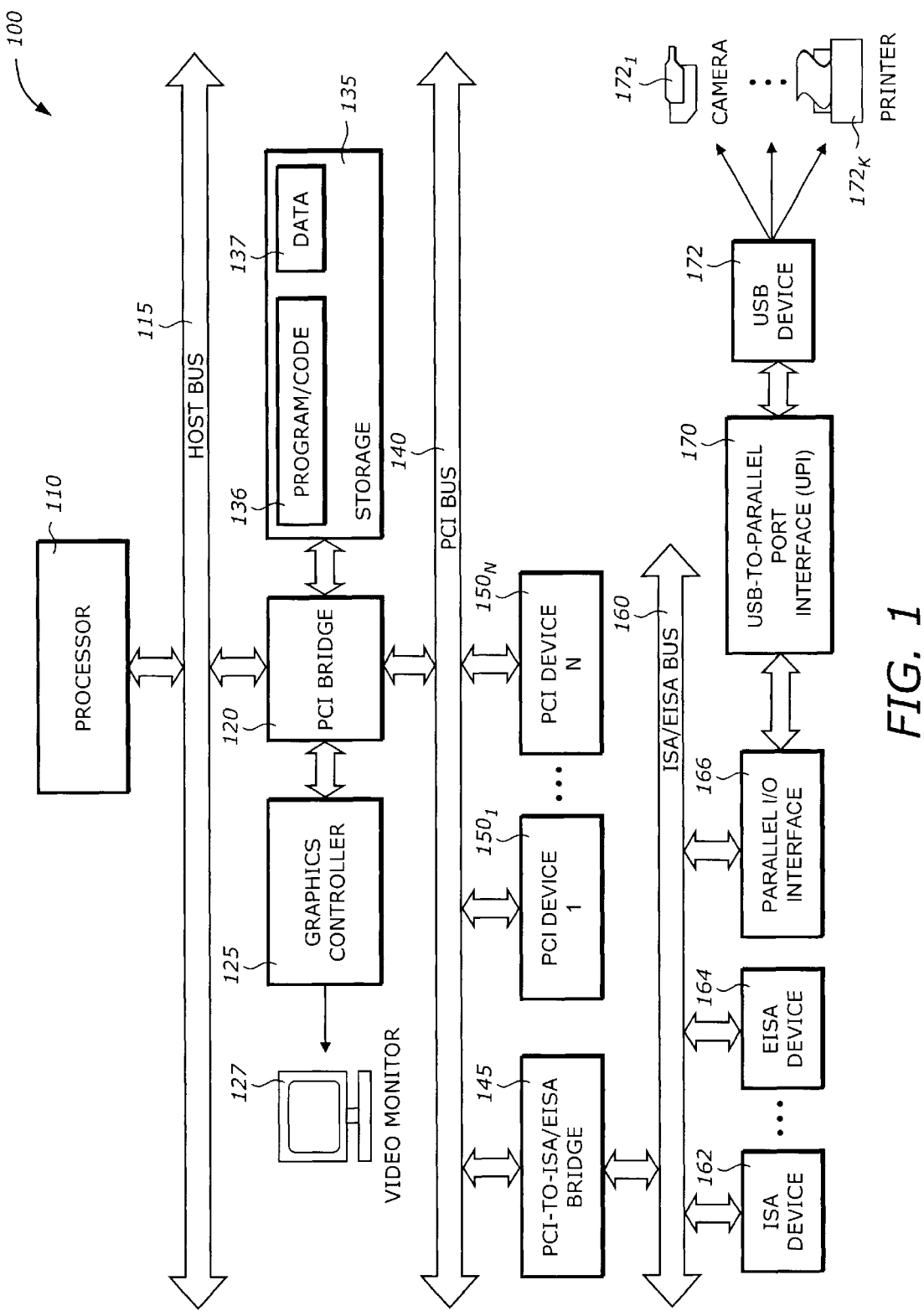
FIG. 1 is a diagram illustrating one embodiment of a computer system 100 in which one embodiment of the present invention may be utilized.

FIG. 1 is a diagram illustrating one embodiment of a computer system 100 in accordance with the teachings of the present invention. Computer system 100 comprises a processor 110 and a PCI bridge 120. The host processor 110 represents a central processing unit of any type of architecture, such as complex instruction set computers (CISC), reduced instruction set computers (RISC), very long instruction word (VLIW), or hybrid architecture. The processor 110 is coupled to the PCI bridge 120 via a host bus 115. While this embodiment is described in relation to a single processor computer system, the invention could be implemented in a multi-processor computer system.

The PCI bridge 120 provides an interface between the host bus 115 and a PCI bus 140. The PCI bridge 120 also provides a graphic port, e.g., Accelerated Graphics Port (AGP), for connecting to a graphics controller 125. The graphics controller 125 is interfaced to a video monitor 127. The video monitor 127 displays graphics and images rendered or processed by the graphics controller 125. The PCI bridge 120 provides an interface to a storage device 135.

The storage device 135 represents one or more mechanisms for storing data. For example, the storage device 135 may include read only memory (ROM), random access memory (RAM), magnetic disk storage mediums, optical storage mediums, flash memory devices, and/or other machine-readable mediums. FIG. 1 also illustrates that the storage device 135 has stored therein data 137 and program code 136. Program code 136 represents the necessary code for performing all or a subset of the techniques in the present invention. Of course, the storage device 135 preferably contains additional software (not shown), which is not necessary to understanding the invention. The PCI bus 140 represents an expansion bus that allows the processor 110 to communicate with a number of peripheral devices. The PCI bus 140 provides an interface to a PCI-to-ISA/EISA bridge 145, PCI devices $150_1$ to PCI device $150_N$. The PCI devices $150_1$ to $150_N$ represent any device that is interfaced to the PCI bus 140. Examples of PCI devices are fax/modem controllers, audio cards, network controllers, etc.

The PCI-to-ISA/EISA bridge 145 represents an interface device between the PCI bus 140 and an ISA/EISA bus 160. The ISA/EISA bus 160 represents a peripheral bus that interfaces to a number of peripheral devices, including an ISA device 162, an EISA device 164, and a parallel input/output interface 166.

The parallel I/O interface 166 represents at least one parallel port of the PC system. The parallel I/O interface 166 is connected to a USB-to-parallel port interface (UPI) 170 which provides the data flow management, the virtualization of the USB endpoints, and the conversion of communication protocols between a USB device 172 and the parallel port. The USB device 172 represents any device that has an USB interface. Examples of USB devices include USB camera $172_1$, USB printer $172_K$, etc.

USB-TO-PARALLEL PORT INTERFACE

The USB-to-parallel port interface (UPI) 170 in FIG. 1 provides the communication interface between a USB device and a parallel port.

Figure 2:
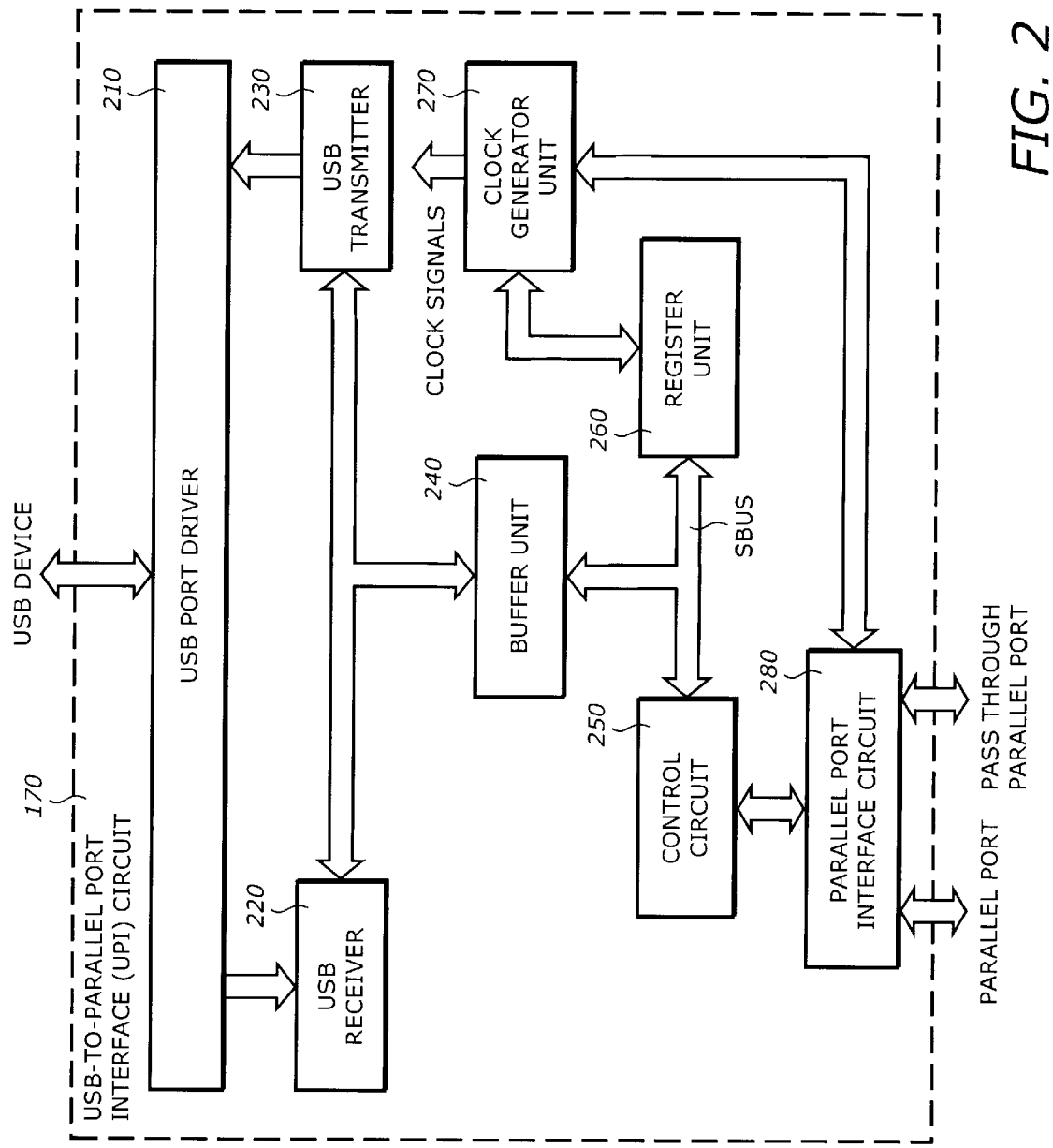
FIG. 2 is a diagram illustrating a USB-to-parallel interface circuit according to one embodiment of the invention.

FIG. 2 is a diagram illustrating a USB-to-parallel interface (UPI) circuit 170 according to one embodiment of the invention. The UPI circuit 170 includes a USB port driver 210, a USB receiver 220, a USB transmitter 230, a buffer unit 240, a control circuit 250, a register unit 260, a clock generator unit 270, and a parallel port interface circuit 280.

The USB port driver 210 provides buffers and level shifter circuitry to convert USB signals to the logic signals compatible with the USB receiver 220 and the logic signals from the USB transmitter 230 to the USB signals.

The USB receiver 220 performs a number of functions to receive the USB data from the USB device. These functions include clock synchronization, decoding data stream, decoding sync and packet identification (PID), and data buffering and storage.

The USB transmitter 230 performs a number of functions to transmit data to the USB device. These functions include selecting data, encoding the bit pattern (e.g., stuffing, Non Return to Zero Invert or NRZI), generation of the cyclic redundancy code (CRC), and keeping track of the Start of Frame (SOF) counter.

The buffer unit 240 manages the data flow between the USB receiver 220/USB transmitter 230 and the parallel port. The buffer unit 240 buffers the data in first-in-first-out (FIFO) queues, keeps track of the addressing, and controls the reading and writing of data.

The control circuit 250 receives information from the parallel port and the buffer unit 240, generates control signals to the buffer unit 240 and the register unit 260, and coordinates the data transfers between the parallel port and other units.

The register unit 260 has a number of registers to store the temporary information related to the USB and parallel port interfaces such as the PID, the address, the status, the packet size, etc. The processor 110 can read status or write control or command information from/to the register unit 260 via the parallel port.

The clock generator unit 270 generates all the timing and clock signals to various units and circuits in the UPI circuit 170.

The parallel port interface circuit 280 provides the interface to the parallel port, supporting different standards including standard, bi-directional, enhanced parallel port (EPP), and extended capabilites port (ECP). In one embodiment, the parallel port interface 280 is the Parallel Port Interface Chip PPC34C60, manufactured by Standard Microsystems Corporation of Hauppauge, N.Y.

Figure 3:
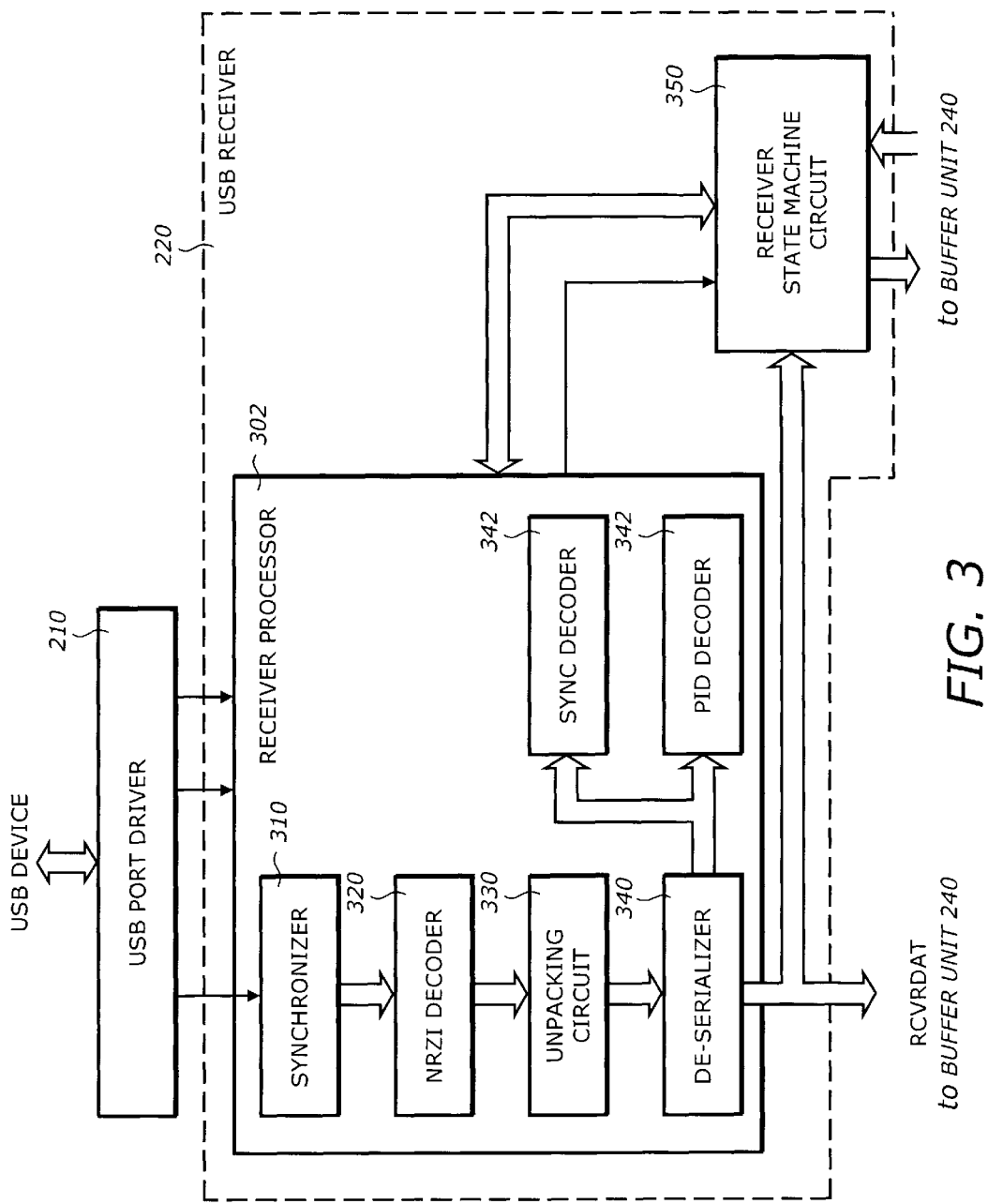
FIG. 3 is a diagram illustrating a USB receiver circuit according to one embodiment of the invention.

FIG. 3 is a diagram illustrating a USB receiver circuit 220 according to one embodiment of the invention. The USB receiver circuit 220 includes a receiver processor 302 and a receiver state machine circuit 350. The receiver processor 302 includes a synchronizer 310, a non return to zero invert (NRZI) decoder 320, an unpacking circuit 330, a de-serializer 340, a sync decoder 342, and a packet identification (PID) decoder 344.

The receiver processor 302 receives signals and data from the USB port driver 210 and generates data to the buffer unit 240 and to the receiver state machine circuit 350.

The synchronizer 310 synchronizes the clock signals from the USB port driver 210. The synchronization is performed by a phase-locked loop circuit which locks onto the USB sync signal and generates a data clock to the receiver state machine circuit 350. In one embodiment, the clock frequency is 12 MHz. The NRZI decoder 320 decodes the NRZI encoded signal by converting the NRZI-encoded bits to the raw data. The unpacking circuit 330 removes the redundant stuffed bit in the data stream. The de-serializer 340 converts the serial data stream into parallel data. In one embodiment, the de-serializer 340 is a serial-to-parallel shift register. The de-serializer 340 stores the received data (RCVRDAT) that will be written to the buffer unit 240. The sync decoder 342 detects the sync code by matching the received data with the synchronization sequence. According to the USB protocol, the synchronization sequence alerts the USB receiver block 302 that a packet is being sent which will immediately follow the 8-bit sync sequence. The current USB specification defines the sync sequence to be 00000001. The PID decoder 344 detects the packet ID (PID) by extracting the bit pattern that follows the sync sequence.

The receiver state machine circuit 350 receives the control and status signals from the buffer unit 240 and generates other control signals such as write enables to FIFO's, counter enables, and counter clear controls. The operation of the receiver state machine circuit 350 will be explained later.

Figure 4:
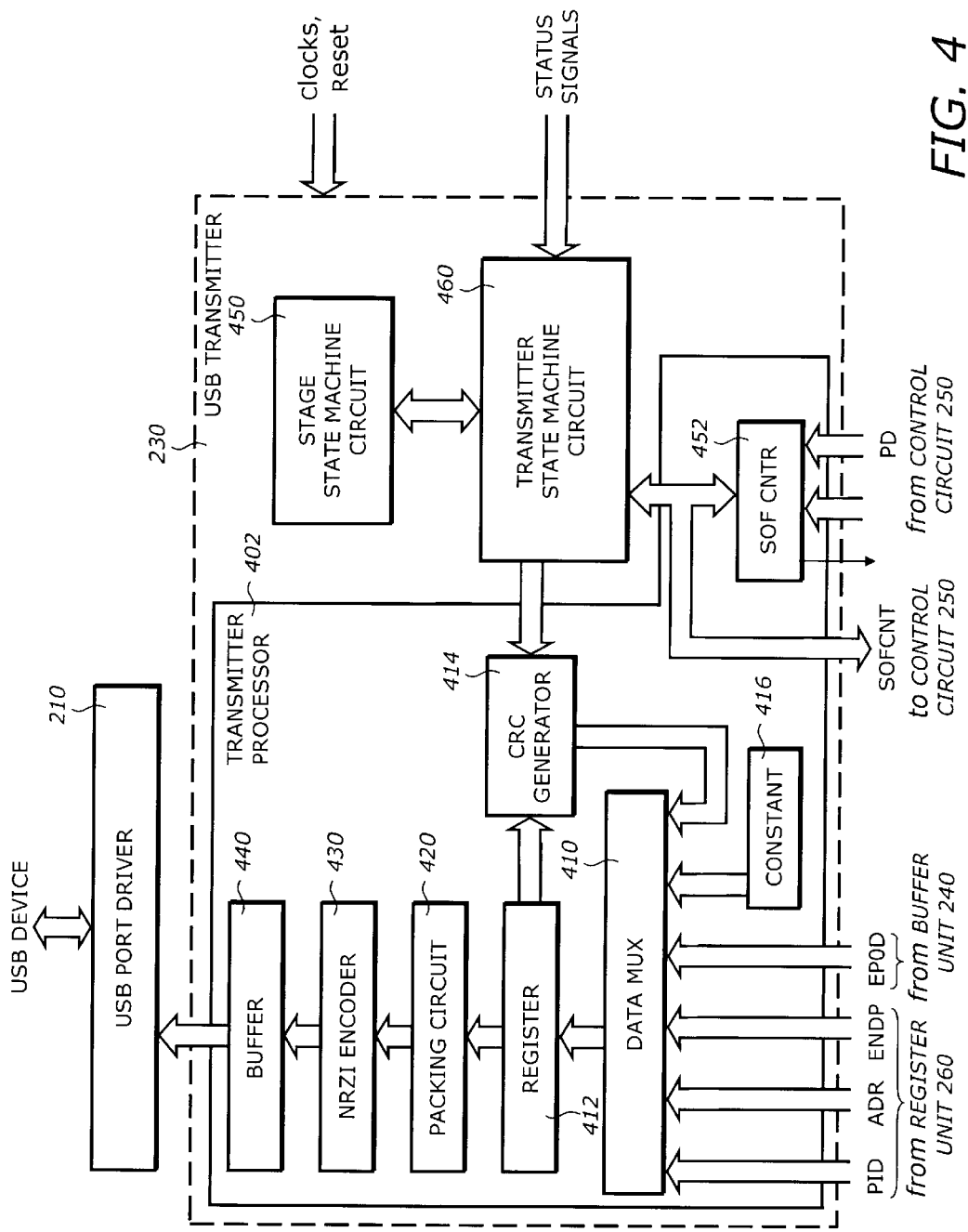
FIG. 4 is a diagram illustrating a USB transmitter circuit according to one embodiment of the invention.

FIG. 4 is a diagram illustrating a USB transmitter 230 according to one embodiment of the invention. The USB transmitter 230 includes a transmitter processor 402, a stage state machine circuit 450, and a transmitter state machine circuit 460. The transmitter processor 402 receives control signals and data from the control circuit 250 and the register unit 260, and transmits data to the USB port driver 210. The data transmission begins after an IN command is issued to the UPI circuit 170 by the processor 110. The transmitter processor 402 includes a data mux 410, a register 412, a CRC generator 414, a constant register 416, a packing circuit 420, an NRZI encoder 430, a buffer 440, and a Start of Frame (SOF) counter 452.

The data mux 410 selects data to be transmitted from a group of data including the PID, address (ADR), endpoint data (ENPD) from the register unit 260, the EP0D from the buffer unit 240, the constant from the constant register 416 and the output of the CRC generator 414. The register 412 stores the data selected by the data mux 410. The CRC generator 414 receives the selected data and generates the CRC corresponding to the selected data. The constant register 416 stores a predetermined constant. The packing circuit 420 encodes the data by inserting an extra bit when there are six consecutive zero's. The NRZI encoder 430 converts the data into the NRZI-encoded data. The buffer 440 provides appropriate buffer to interface to the USB port driver 210. The SOF CNTR 452 is a counter to keep track of the start of frame (SOF) counts.

The stage state machine circuit 450 coordinates with the transmitter state machine circuit 460 to generate control signals with respect to a stage. A stage corresponds to a state in the USB transactions such as idle (IDLE), handshaking (HAND), token (TOKEN), and data output (DOUT). The transmitter state machine circuit 460 receives the status information from the buffer unit 240 such as EP0FULL, EP1DONE, and EP2DONE and the SOF CNTR 452, and generates control signals to various components in the USB transmitter 230 with respect to a packet.

Figure 5:
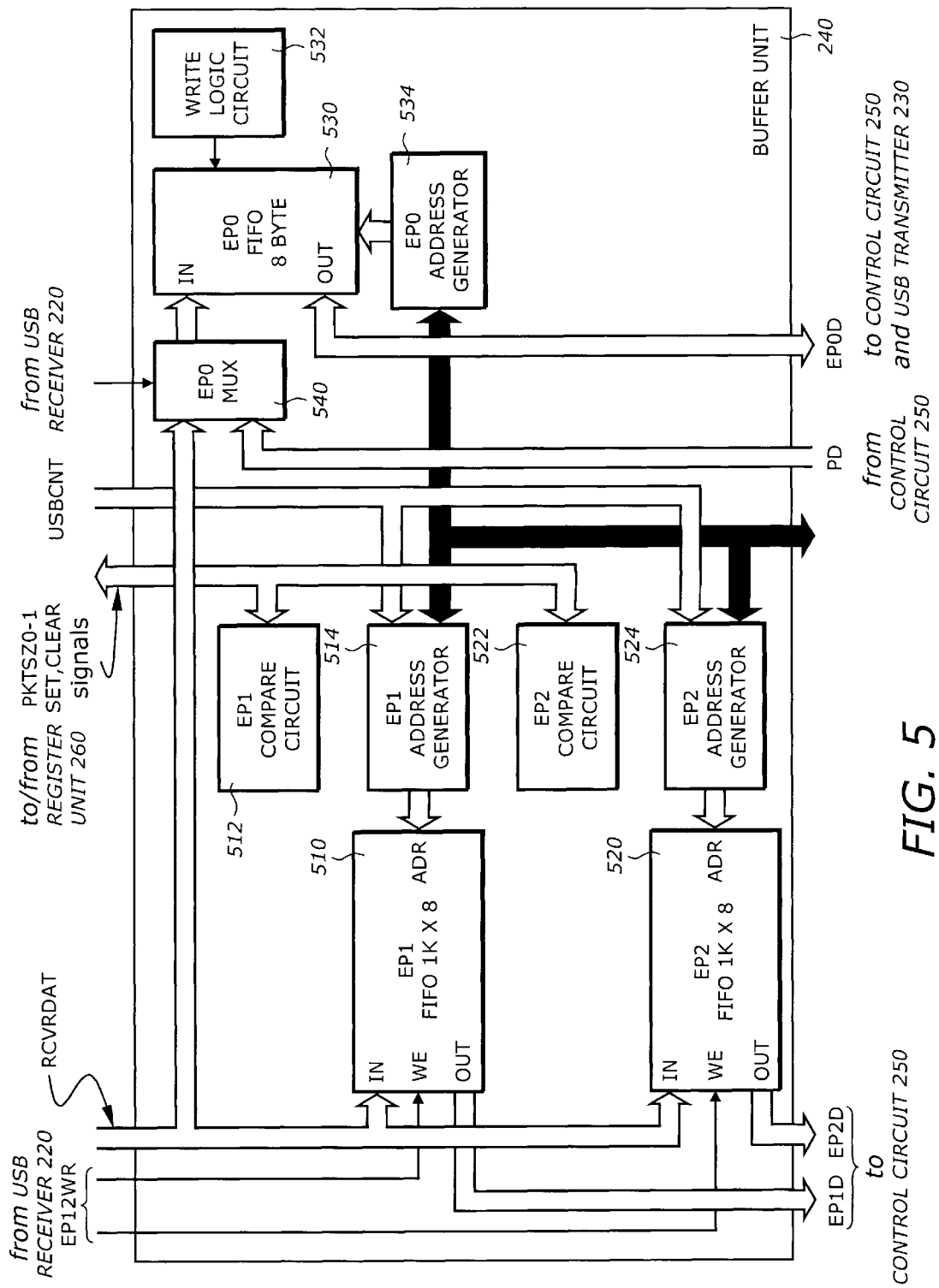
FIG. 5 is a diagram illustrating a buffer unit according to one embodiment of the invention.

FIG. 5 is a diagram illustrating a buffer unit 240 according to one embodiment of the invention. The buffer unit 240 is interfaced to the control circuit 250, the USB receiver 220, and the USB transmitter 230. The buffer unit 240 includes three first-in-first-out (FIFO) elements to buffer the data received from the USB device and transfer the received data to the parallel port. The buffer unit 240 includes an EP1 FIFO 510, an EP1 compare circuit 512, an EP1 address generator 514, an EP2 FIFO 520, an EP2 compare circuit 522, an EP2 address generator 524, an EP0 FIFO 530, a write logic circuit 532, an EP0 address generator 534, and an EP0 mux 540.

The EP1 FIFO 510 corresponds to the endpoint number 1 (EP1). In one embodiment, the EP1 is a static RAM organized as 1024 (1K)×8. The EP1 FIFO 510 receives the received data (RCVRDAT) from the USB receiver 220 and generates the output EP1D to the control circuit 250. The EP1 FIF O 510 receives the write control signal EP12WR from the USB receiver 220. The EP1 address generator 514 receives the USBCNT and the control signals from the control circuit 250 to generate the address to the EP1 FIFO 510. The EP1 compare circuit 512 receives the packet size information (PKTSZ0–1) and other set and clear control signals from the register unit 260 to determine if the EP1 FIFO 510 is full or empty. The EP2 FIFO 512, EP2 address generator 524, and EP2 compare circuit 522 are essentially the same as the EP1 FIFO 510, EP1 address generator 514, and EP1 compare circuit 512, respectively, except that they correspond to and operate with the endpoint number 2 (EP2). The two sets of FIFO's operate in an alternating manner to form a double-buffered data queue to receive the data from the USB receiver and forward to the parallel port via the control circuit 250. By having two FIFO's receiving the data from the USB device, the system can operate asynchronously with the USB data rate.

In one embodiment, the EP0 FIFO 530 is a static RAM organized as 8×8 containing 8 byte s of information. The EP0 address generator 534 generates the address to the EP0 FIFO 530. The write logic circuit 532 generates the appropriate write enable signals to the EP0 FIFO 530. The EP0 MUX 540 switches the data source to the EP0 FIFO 530 between the RCVRDAT from the USB receiver circuit 220 and the packet data (PD) from the control circuit 250. The EP0 FIFO 530 generates the output data EP0D to the control circuit 250 and the USB transmitter 230.

Figure 6:
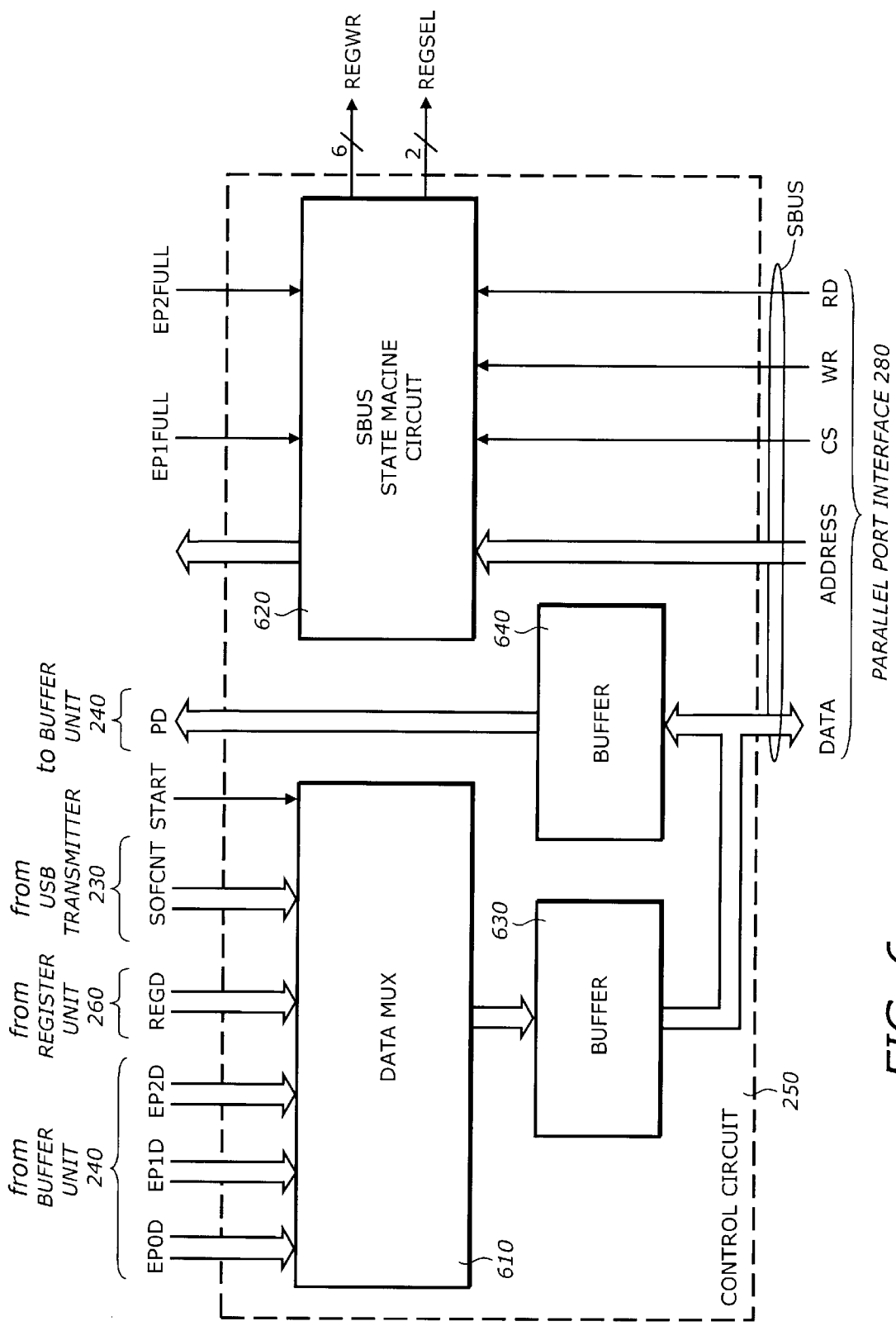
FIG. 6 is a diagram illustrating a control circuit according to one embodiment of the invention.

FIG. 6 is a diagram illustrating a control circuit 250 according to one embodiment of the invention. The control circuit 250 contains the necessary logic to interface the parallel port interface 280 and the buffer unit 240 and the register unit 260. The control circuit 250 includes a data mux 610, an SBUS state machine 620, and buffers 630 and 640.

The data mux 610 receives five data sources, including the EP0D, EP1D, EP2D (from buffer unit 240), REGD (from register unit 260), and SOFCNT (from USB transmitter 230) and selects one of the five data sources to transmit to the buffer 630. The buffer 630 buffers the output of the data mux 610 to the data port at the parallel port interface 280. The buffer 640 buffers the data from the buffer 630 and the parallel port interface 280 to the PD data lines of the buffer unit 240.

The SBUS state machine 620 receives the address, chip select (CS), write enable (WR) signal, and read enable (RD) signal from the parallel port interface 280, and the EP1FULL and EP2FULL signals from the buffer unit 240 to generate control signals which include the read/write strobes and FIFO select and chip enables, a read data selection mux, and register address selection. The SBUS state machine 620 decodes the address lines, CS, WR, and RD from the parallel port interface 280 to create the address selection and read/write strobe to the register unit 260.

Figure 7:
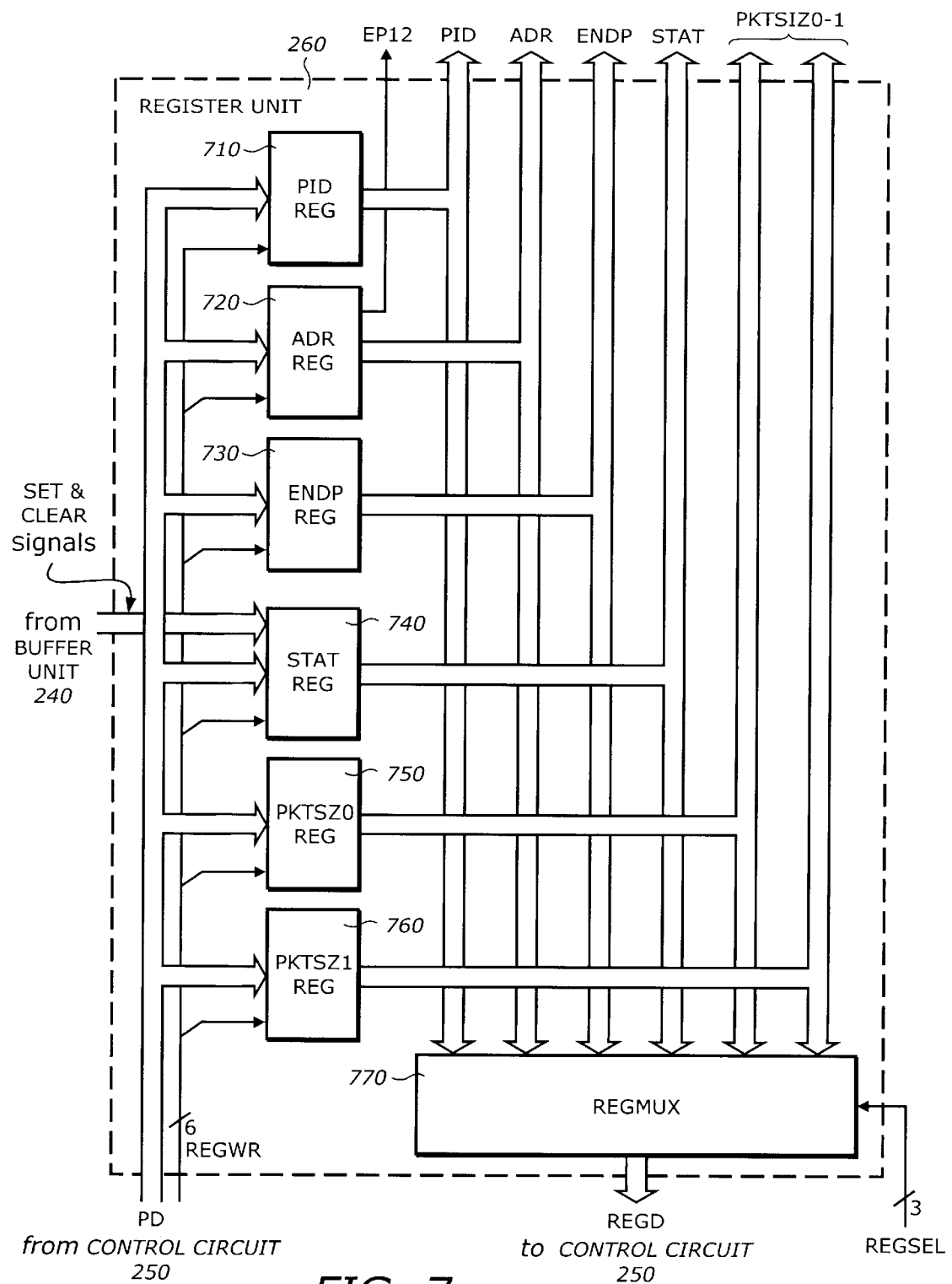
FIG. 7 is a diagram illustrating a register unit according to one embodiment of the invention.

FIG. 7 is a diagram illustrating a register unit 260 according to one embodiment of the invention. The register unit 260 is a block of registers used to control various operational parameters for the UPI circuit 170 and indicate the status of the buffer unit 240. These operational parameters include the size of the USB data received, the USB PID, address, and endpoint data to send to the USB device. All register bits in the register unit 260 are readable and writeable. The write data is provided via the PD signal lines and the register write enable signals (REGWR) from the control circuit 250. The register unit 260 includes a PID register (PID REG) 710, an address register (ADR REG) 720, an endpoint register (ENDP REG) 730, a status register (STAT REG) 740, a packet size 0 register (PKTSZ0 REG) 750, a packet size 1 register (PKTSZ1 REG) 760, and a register mux (REGMUX) 770.

The PID REG 710 stores the packet ID (PID) information. The ADR REG 720 stores the address information. The ENDP REG 730 stores the endpoint information. The STAT REG 740 stores the status information including the FIFO status, set and clear control bits such as clear FIFO counter, EP0, EP1, and EP2 full status. The PKTSZ0 REG and the PKTSZ1 REG store the packet size information by forming a 10-bit value representing a maximum packet size of 1023. These registers provide the data PID, ADR, ENDP, STAT, PKTSZ0, and PKTSZ1. The REGMUX 770 selects one of the six data sources PID, ADR, ENPD, STAT, PKTSZ0, and PKTSZ1 to the REGD signal lines to the control circuit 250. The selection is provided by the REGSEL select lines.

Each of the registers has an address as decoded from the parallel port interface 280 and contains an 8-bit data. The processor 110 can address these registers as memory locations via the parallel port interface 280.

MANAGING DATA FLOW

As shown in FIG. 2, the data flow between the USB device and the parallel port is managed by the buffer unit 240 and the control circuit 250. From the USB device, the data goes through the USB port driver 210, the USB receiver 220, the buffer unit 240, the control circuit 250, and the parallel port interface 280, and finally to the parallel port at the processor I/O interface. From the parallel port at the processor I/O interface, the data from the processor goes through the parallel port interface 280, the control circuit 250, the buffer unit 240, the USB transmitter 230, the USB port driver 210, and finally to the USB device.

The use of the double-buffered FIFO's allows simultaneous reading and writing of data. In one embodiment, the data are read from a USB device, e.g., a USB camera, which continuously sends data to the parallel port. In this embodiment, the two FIFO's are configured for inputting data from the USB device. As is known by one skilled in the art, a similar configuration can be made for applications where the processor continuously sends data to the USB device. In such applications, the write and read data paths to the two FIFO's are merely exchanged and the output data paths go to the USB transmitter 230. For applications requiring bidirectional data flows, two sets of FIFO pairs can be integrated in the same unit.

The buffer unit 240 allows the USB device to input data at one data rate and allows the processor to read the received data at another data rate. For isochronous data transfer, the data transfer timing is important. The USB device sends data to the UPI circuit 170 at its own data rate dictated by the USB protocol. The buffer unit 240 has two endpoint buffer queues, EP1 FIFO and EP2 FIFO. While one buffer queue operates in a write mode, storing the continuous data stream as sent by the USB device at one data rate, the other buffer queue operates in a read mode, available for reading by the processor 110 via the parallel port at another data rate. When the receive buffer is full, the roles of the two buffer queues are exchanged, allowing the read buffer to become the write buffer and the write buffer to become the read buffer. The operation of the two endpoint buffers is transparent to the processor 110 and the USB device.

Figure 8A:
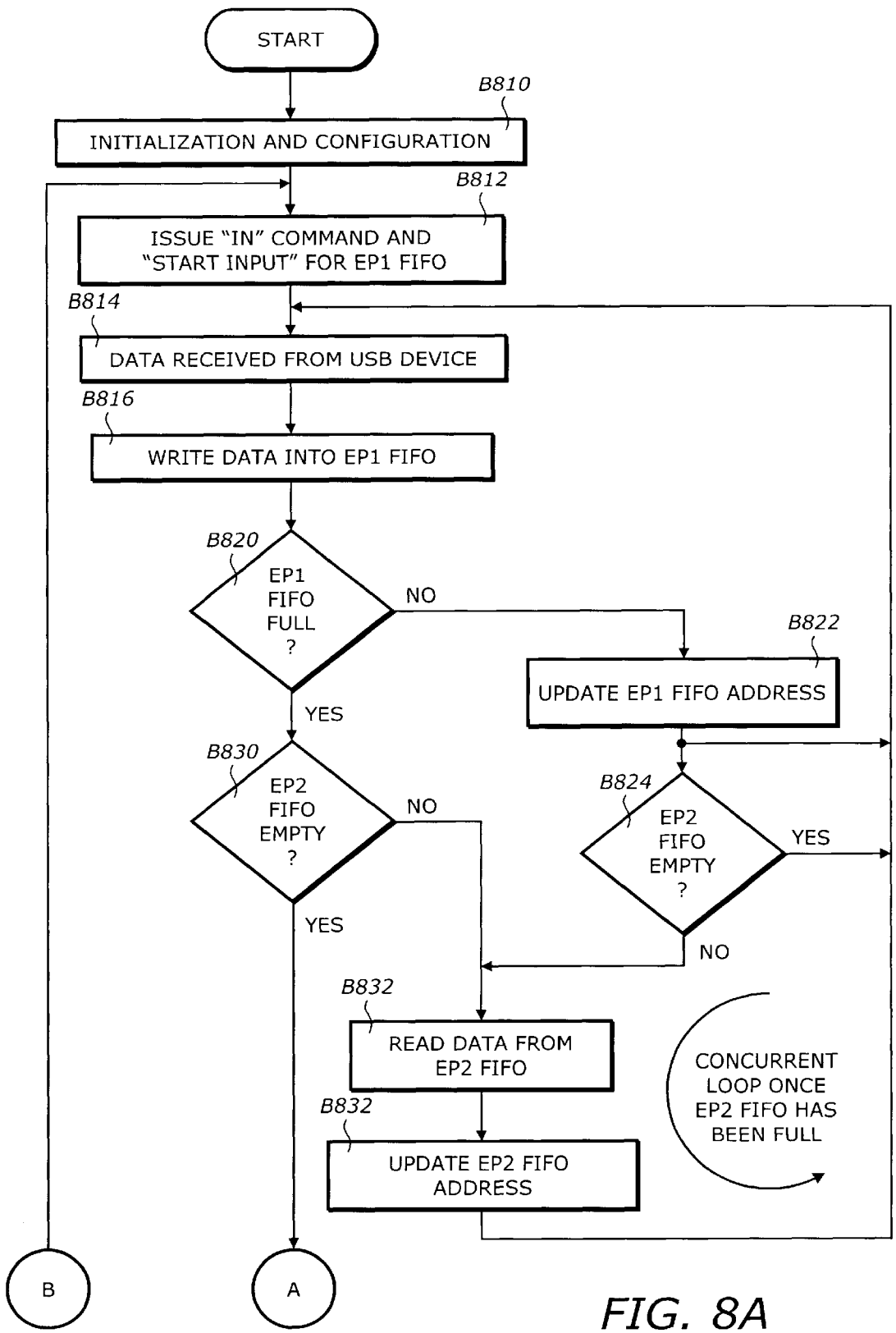
FIGS. 8A and 8B are a flowchart illustrating a process to manage the data flow between the USB device and the parallel port according to one embodiment of the invention.
Figure 8B:
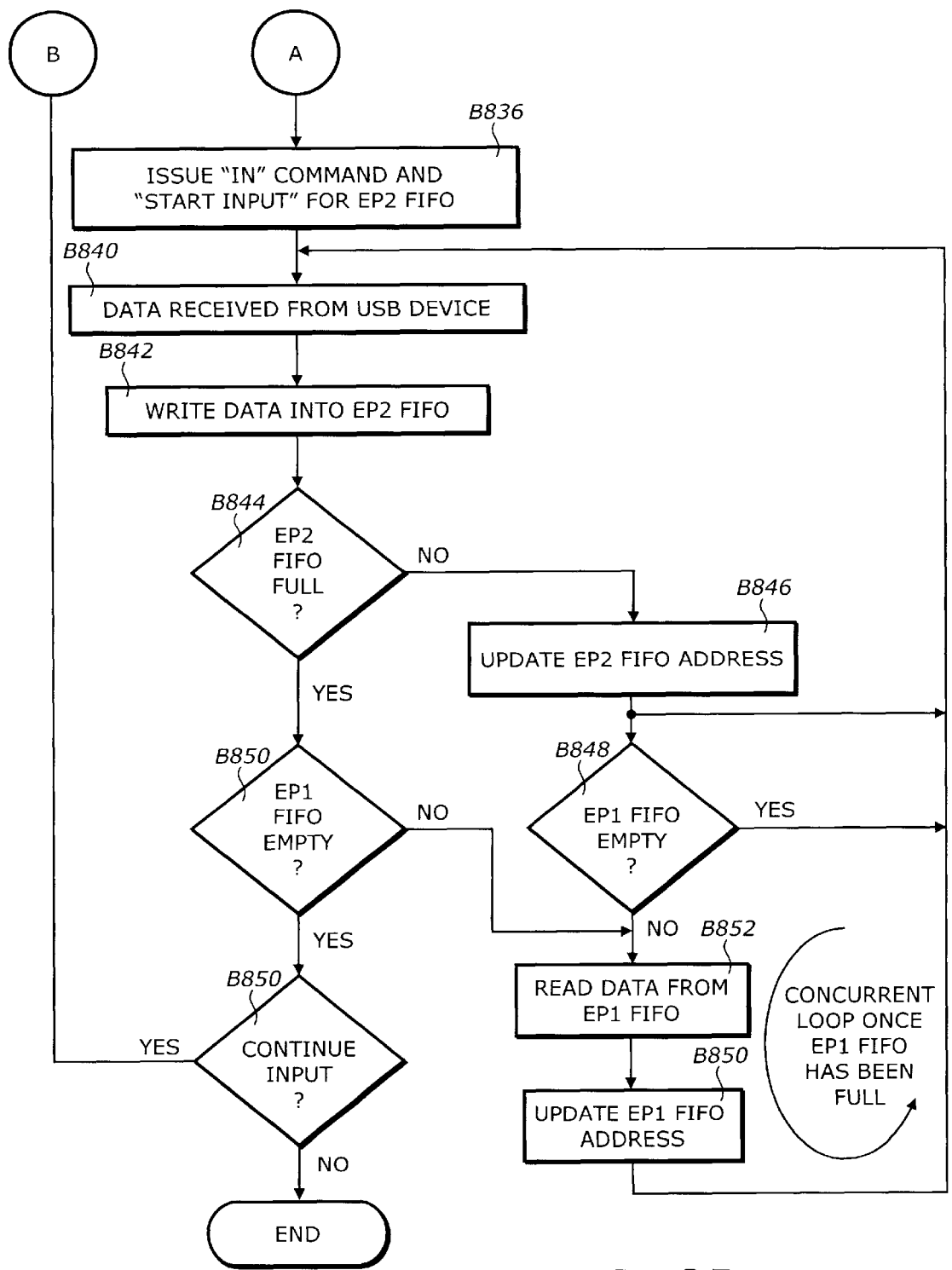

FIG. 8 is a flowchart illustrating a process P800 to manage the data flow from the USB device to the parallel port. As an example, the USB device is a USB camera which continuously captures the video information and sends the digitized pixels to the processor via the UPI circuit 170.

From a START state, the process P800 enters block B810. In block B810, the process P800 initializes and configures the USB-to-parallel interface (UPI). This includes writing the packet ID to the PID register, the packet size to the PKTSZ0 and PKTSZ1 registers, initiating the proper SETUP sequence if necessary, initializing the USB camera, initializing all the counters including the SOF counter, the EP0, EP1, and EP2 address counters, etc. Then the process P800 enters block B812. In block B812, the host processor issues an IN command and a start input command to the UPI 170 via the parallel port interface circuit 280. The state machine will go through the sequence to generate the IN packet to notify the USB camera that data is being requested by the system. When the IN packet is sent, the USB camera responds by sending the captured pixel data. The process P800 enters block B814 to receive the data from the USB camera. The process P800 then enters block B816 to write the data into the EP1 FIFO.

The process P800 then enters block B820 to determine if the EP1 FIFO is full. If the EP1FIFO is not full, the process P800 enters block B822. If the EP1 FIFO is full, the process P800 enters block B830. In block B822, the process P800 updates the EP1 FIFO address counter, goes back to block B814 and concurrently enters block B824 to determine if the EP2 FIFO is empty. If the EP2 FIFO is empty, the process P800 returns to block B814. If the EP2 FIFO is not empty, the process P800 enters block B832 to begin reading data from EP2 FIFO. In block B830, the process P800 determines if the EP2 FIFO is empty. If the EP2 FIFO is not empty, the process P800 enters block B832 to read data from the EP2 FIFO. The process P800 then enters block B834 to update the EP2 FIFO address counter. Then the process P800 returns to block B814. If the process P800 determines that the EP2 FIFO is empty in block B830, it enters block B836 to issue the next IN command and the start input command to the UPI 170. The process P800 then writes data into the EP2 FIFO in block B842.

The process P800 then enters block B844 to determine if the EP2 FIFO is full. If the EP2 FIFO is not full, the process P800 enters block B846. If the EP2 FIFO is full, the process P800 enters block B850. In block B846, the process P800 updates the EP1 FIFO address counter, goes back to block B840 and concurrently enters block B848 to determine if the EP1 FIFO is empty. If the EP1 FIFO is empty, the process P800 returns to block B840. If the EP1 FIFO is not empty, the process P800 enters block B852 to begin reading data from EP1 FIFO. In block B850, the process P800 determines if the EP1 FIFO is empty. If the EP1 FIFO is not empty, the process P800 enters block B852 to read data from the EP1 FIFO. The process P800 then enters block B854 to update the EP1 FIFO address counter. Then the process P800 returns to block B840. If the process P800 determines that the EP1 FIFO is empty in block B850, it enters block B860 to determine if the image capturing continues. If YES, the process P800 returns to block B812. If NO, the process P800 terminates.

It should be noted that although the process P800 is described with sequential operations, many operations can be performed in parallel and asynchronously. For example, the reading from the FIFO does not have to be synchronized with the writing to the FIFO. In addition, not shown in the flowchart is the SOF counting operation. The SOF counter generates a SOF every 1 msec by using the SOF counter.

The use of the two FIFO's in the FIFO unit to receive data from the USB device allows the host processor to access data as frequently as necessary without waiting for the fixed time interval as dictated by the USB protocol. As is known by one skilled in the art, if more buffering is needed, the FIFO size can be expanded, or the number of FIFO's can be increased. Furthermore, the same design can be similarly derived for data flow from the host processor to the USB device.

VIRTUALIZING USB ENDPOINTS THROUGH ADDRESS SPACE

The UPI provides an interface between the host processor and the USB device. The host processor does not need to know the existence of the USB hardware. There is no need to provide the host the software to communicate with the USB device by emulating the USB protocol signals. In addition, there is no need to interface the host processor to a general purpose USB host controller.

In essence, the UPI provides a mechanism to virtualize the endpoints. In other words, the host processor communicates with the endpoints as if they were registers or memory locations mapped into the processor's address space.

The parallel port interface circuit 280 in FIG. 2 provides the interface for the parallel port. In one embodiment, the parallel port interface circuit 280 is the SMC34C60 device. In alternate embodiments, other parallel port devices can be used. The host processor initializes the SMC34C60 by programming a sequence of commands or configuration data in the internal registers of the SMC34C60.

Virtualizing the USB endpoints include mapping registers in the UPI that support a USB transaction to the address space of the processor. The parallel port interface circuit 280 provides access to the address space of the processor. From the processor's point of view, these registers are like a memory or input/output locations. The USB endpoints are also mapped to the address space of the processor via an address register and corresponding data registers.

In addition to the mapping mechanism, a USB transaction is also supported by a series of commands issued by the processor to the UPI. These commands activate the corresponding USB transactions such as set-up, input, and output transactions. The processor can also read the status information from the UPI registers to determine the status of a particular transaction; for example, whether or not an endpoint FIFO is full or empty.

UPI Registers:

Once the internal registers of the SMC34C60 are set up, the UPI registers in the register unit 260 can be set up accordingly. FIG. 9 shows the UPI register address map. In one embodiment, the UPI has 10 assigned addresses for 10 registers. These registers include a PID register, an address register, an endpoint register, a status register, a packet size 0 register, a packet size 1 register, an EP0 data register, an EP1 data register, an EP2 data register, a SOF counter 0 register, and an SOF counter 1 register, occupying the address offsets at 0x00, 0x01, 0x02, 0x03, 0x04, 0x05, 0x06, 0x07, 0x08, 0x09, and 0x0A, respectively.

The PID register (PID REG) stores two PID's with 4 bits per PID. The PID register bits are programmed selectively (according to USB standard protocol and encodings) as follows:

| | PID REG[3:0] | PID REG[7:4] |
|---|---|---|
| a) | SETUP | DATA0 |
| b) | OUT | DATA0 or DATA1 |
| c) | IN | ACK |
| d) | IN | IN |

The address register (ADR REG) corresponds to the address field in the USB protocol and stores the 7-bit address of the source or destination of a data packet, depending on the desired use of USB device and the value of the token PID. The endpoint register (ENDP REG) corresponds to the endpoint field in the USB protocol and stores two endpoint addresses (4 bits each).

The status register (STAT REG) stores the following bits: stall received (stall_rcvd), no acknowledge received (nak_rcvd), generated SOF (gen_sof), bit clear enable (bitclr_en), EP0 full (ep0full), EP1 full (ep1full), EP2 full (ep2full), and clear FIFO counter (clr_fifocnt). The stall_rcvd bit indicates that the target device returns a STALL handshake to inform that the error condition should be cleared before the data can be returned. The nak_rcvd bit indicates that the device is unable to return data during the data phase of the transaction. The gen_sof bit indicates that the SOF is generated. The bitclr_en bit is used to enable the clearing of the bits as follows. If the bitclr_en is 1 during a write to the status register, then each data bit that is 1 will clear the associated bit in the status register. If bitclr_en is 0, then each data bit that is 1 will set in the status register. The ep0full, ep1full, and ep2full bits, when set, indicate that the EP0 FIFO, the EP1 FIFO, and the EF2 FIFO are full, respectively. The clr_fifocnt bit is used to clear the FIFO address counters in case the counter is out of sequence for some reason.

The packet size registers PKTSZ0 and PKTSZ1 are used to indicate the size of the data packet. The PKTSZ0 register stores the lower 8 bits of the packet size. The PKTSZ1 register stores the upper 2 bits of the packet size. The remaining bits in the PKTSZ1 register are unused. Each of the EP0, EP1, and EP2 data registers corresponds to the data field in the USB protocol. The EP0, EP1, and EP2 data registers store the data for the EP0, EP1, and EP2 FIFO's in the buffer unit 240. The SOF counter 0 and counter 1 registers store the 14-bit counter value of the Start of Frame (SOF) counter. The SOF counter 0 stores the lower 8-bit value and the SOF counter 1 stores the upper 6-bit values. The SOF counter 1 register also stores the startcnt bit to start the counter.

Reading and Writing UPI Registers:

Once the internal registers of the SMC34C60 are set up, the UPI registers can then be set up accordingly. A write and a read are done by issuing an address cycle with data byte of 0xCX and 0x8X, respectively, where X is the corresponding address offset value. This selects the shorthand unrestricted bus address mode in the SMC34C60. The unrestricted system data bus access allows the host processor to access data via the system data bus (SBUS), as opposed to DRAM access or internal register access. Next a data cycle is issued with the data byte being the data to write in the selected UPI registers.

Reading and Writing From/to EP0 FIFO:

A write is done to the EP0 FIFO by issuing an address cycle with a data byte of 0xC6. A read is done by using a data byte of 0x86. This selects the shorthand unrestricted bus address mode in the SMC34C60. Next a write data cycle is issued with the 8 data bytes to write in the selected UPI EP0 FIFO. For each byte of data, the address counter for the EP0 FIFO is incremented to the next address. After writing 8 bytes, the ep0full bit is set in the status register 740 (FIG. 7) of the register unit 260. This ep0full bit is also set by an 8-byte write from the USB device in response to an IN command to the EP0. The ep0full bit is set to indicate to the host processor that data is ready to the host after issuing the IN command to endpoint 0.

Once the EP0 data are written into the EP0 FIFO, the UPI is ready to issue a SETUP or OUT command to the USB device.

Issuing SETUP, OUT, and IN Commands to EP0:

To initially set up the USB device, a series of SETUP, OUT, and IN commands are issued through the parallel port in accordance with the USB protocol.

After writing the UPI registers and the EP0 FIFO, the commands are sent to the USB device by setting the start input (startin) strobe bit in the SMC34C60 output register. This startin strobe bit will trigger the USB transmitter 230 which will issue the two commands in the PID register 710 (FIG. 7) with the appropriate timing.

When data has been written into the EP0 FIFO from an IN command, the ep0full bit will be set in the status register 740 (FIG. 7). The host processor may then read data from the EP0 FIFO.

If the host processor issues a zero length data for the status stage of a transaction, the zero_len bit should be set in the SMC34C60 output register before issuing the startin strobe.

Issuing IN commands to EP1 and EP2:

After setting up the UPI PID register 710 (FIG. 7) with the IN PID's, the ep12 (isochronous mode) bit is set in the address register 720 (FIG. 7). Then the total number of bytes to be transferred for both endpoints is written into the packet size registers 750 and 760 (FIG. 7). All full bits (ep0full, ep1full, and ep2full) are cleared in the status register 740. The host processor can then read the data from the EP0 FIFO and EP1 FIFO as explained earlier.

The host processor, therefore, communicates with the USB device via the set of internal registers of the UPI and the parallel port interface. The communication hardware resources are in effect virtualized to map to the address space of the host processor. The complexities of the communication interface between the parallel port and the USB devices are significantly reduced because this communication interface is transparent to the user.

CONVERSION BETWEEN PARALLEL PORT COMMANDS AND USB CYCLES

USB transactions may consist of one, two, or three phases depending on the type. A USB phase is implemented by a packet. A USB phase may consist of a number of USB cycles. Each packet is preceded by a synchronization sequence and ended by an End Of Packet (EOP) code. Each packet typically includes a packet ID (PID), packet specific information, and cyclic redundancy code (CRC) bits.

The three phases in a USB transaction are:

Token packet phase: Each transaction begins with a token phase that defines the type of transaction. There are four types of token packets: the start of frame (SOF) token indicates start of the next 1 ms frame, the input (IN) token specifies a USB transaction used to transfer data from a target USB device to the system, the output (OUT) token specifies a USB transaction used to transfer data from the system to a target USB device, and the setup (SETUP) token indicates the start of a control transfer.

Data packet phase: Many transaction types include a data phase that carries the payload associated with the transfer.

Handshake packet phase: Except isochronous transfers that have no handshake phase, all other USB transfers guarantee data delivery. The handshake phase provides feedback to the sender of data whether or not data was received without error.

The conversion between the parallel port commands and the USB cycles is performed by three state machines corresponding to the stage, the transmitter and receiver of the UPI circuit 170. These state machines includes a stage state machine S1000, a transmitter state machine S1100, and a receiver state machine S1200. The stage state machine S1000, the transmitter state machine S1100, and the receiver state machine S1200 correspond to the stage state machine circuit 450 (FIG. 4), the transmitter state machine circuit 460 (FIG. 4), and the receiver state machine circuit 350 (FIG. 3), respectively.

There are a number of state signals in a state machine. When a signal is asserted, it indicates that the associated function or condition has occurred. When a signal is not asserted, it indicates that the associated function or condition has not occurred. A state is transitioned to another state when a condition or a combination of conditions has occurred. This condition or a combination of condition includes the assertion of the state signals and is described by a state transition equation.

Figure 10:
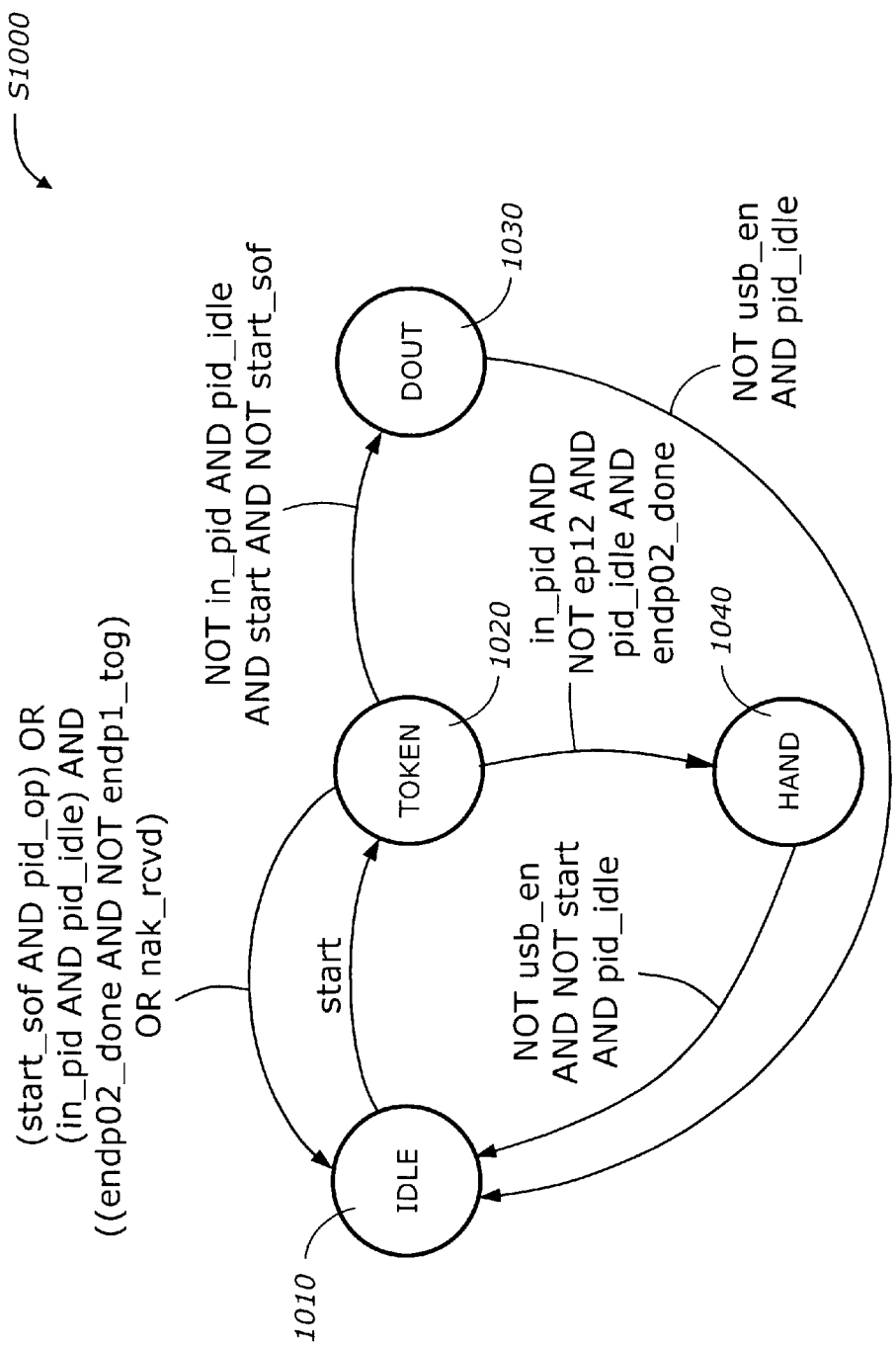
FIG. 10 is a state diagram illustrating a stage state machine according to one embodiment of the invention.

Stage State Machine:

FIG. 10 is a state diagram illustrating a stage state machine S1000 according to one embodiment of the present invention. The stage state machine S1000 includes four states: an idle (IDLE) state 1010, a token (TOKEN) state 1020, a data out (DOUT) state 1030, and a handshake (HAND) state 1040.

The state signals in the stage state machine S1000 are:

start: indicates that an start of frame (SOF) interrupt has occurred or a start of frame command has been issued. The SOF interrupt is generated by a counter. The SOF command is issued by setting the startin strobe in the SMC34C60 output register.

start_sof: indicates that an SOF interrupt is outstanding.

pid_eop: indicates that the state machine is sending out an end of packet signal and will be going to the IDLE state next.

in_pid: indicates that the PID that is being sent is an IN PID which asks for data from the USB camera.

pid_idle: indicates that the state machine is in an idle state.

endp02_done: indicates that the EP0 or EP2 data has been received in response to an IN command.

end1_tog: indicates that the state machine is in reset state. This signal is used to keep the stage state machine in TOKEN state in isochronous mode (ep12 is asserted) until data from both EP1 and EP2 have been received.

nak_rcvd: indicates that the USB camera will send a NAK_PID if it cannot send data during an IN command. The reception of this condition is noted in the status register and the stage state machine S1000 is placed back in the IDLE state instead of going to the HAND state.

The state transition equations are given as follows:

| From | To | State transition equation |
| --- | --- | --- |
| IDLE state 1010 | TOKEN state 1020 | start |
| TOKEN state 1020 | IDLE state 1010 | (start_sof AND pid_eop) OR (in_pid AND pid_idle) AND ((endp02_done AND NOT end1_togg) OR nak_rcvd)) |
| | HAND state 1040 | in_pid AND NOT ep12 AND pid_idle AND endp02_done |
| | DOUT state 1030 | NOT in_pid AND pid_idle AND start AND NOT start_sof |

-continued

| From | To | State transition equation |
|---|---|---|
| HAND state 1040 | IDLE state 1010 | NOT usb_en AND NOT start AND pid_idle |
| DOUT state 1030 | IDLE state 1010 | NOT usb_en AND pid_idle |

Figure 11:
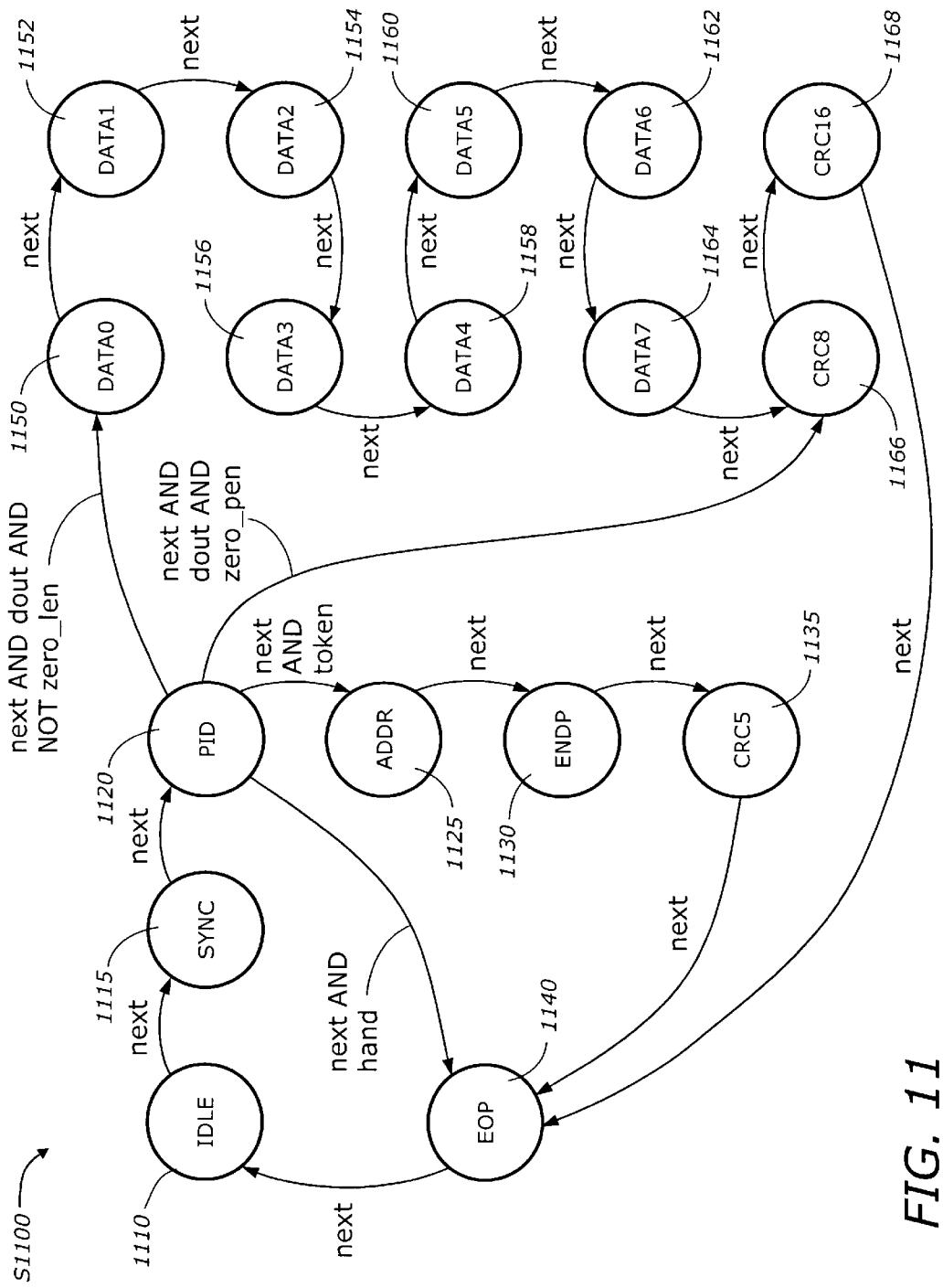
FIG. 11 is a state diagram illustrating a transmitter state machine for the transmitter according to one embodiment of the invention.

Transmitter State Machine:

FIG. 11 is a state diagram illustrating a transmitter state machine for the transmitter according to one embodiment of the present invention. The transmitter state machine S1100 includes an IDLE state 1110, a SYNC state 1115, a PID state 1120, an ADDR state 1125, an ENDP state 1130, a CRC5 state 1135, an EOP state 1140, a DATA0 state 1150, a DATA1 state 1152, a DATA2 state 1154, a DATA3 state 1156, a DATA4 state 1158, a DATA5 state 1160, a DATA6 state 1162, a DATA7 state 1164, a CRC8 state 1166, and a CRC16 state 1168.

The state signals in the transmitter state machine S1100 are:

start: indicates the start of the data transmission.

next: indicates the next state clock cycle.

token: indicates the token phase.

dout: indicates the phase to send out data.

hand: indicates that handshaking is desired.

zero_len: indicates that the length of the data is zero.

The states DATA0 1150 through DATA7 1164 correspond to the transmission of 8 byte s of data. The states CRC8 1066 and CRC16 1068 correspond to computing the cyclic redundancy code. The CRC8 state 1066 computes the first 8 bits and the CRC16 state 1068 computes the next 8 bits. The EOP state 1140 corresponds to the end of packet transmission.

The state transition equations are given as follows:

| From | To | State transition equation |
|---|---|---|
| IDLE state 1110 | SYNC state 1115 | start |
| SYNC state 1115 | PID state 1120 | next |
| PID state 1120 | ADDR state 1125 | next AND token |
| | EOP state 1140 | next AND hand |
| | CRC8 state 1166 | next AND dout AND zero_len |
| | DATA0 state 1150 | next AND dout AND NOT zero_len |
| ADDR state 1125 | ENDP state 1130 | next |
| ENDP state 1130 | CRC5 state 1135 | next |
| CRC5 state 1135 | EOP state 1140 | next |
| EOP state 1140 | IDLE state 1110 | next |
| DATA0 state 1150 | DATA1 state 1152 | next |
| DATA1 state 1152 | DATA2 state 1154 | next |
| DATA2 state 1154 | DATA3 state 1156 | next |
| DATA3 state 1156 | DATA4 state 1158 | next |
| DATA4 state 1158 | DATA5 state 1160 | next |
| DATA5 state 1160 | DATA6 state 1162 | next |
| DATA6 state 1162 | DATA7 state 1164 | next |
| CRC8 state 1166 | CRC16 state 1168 | next |
| CRC16 state 1168 | EOP state 1140 | next |

Figure 12:
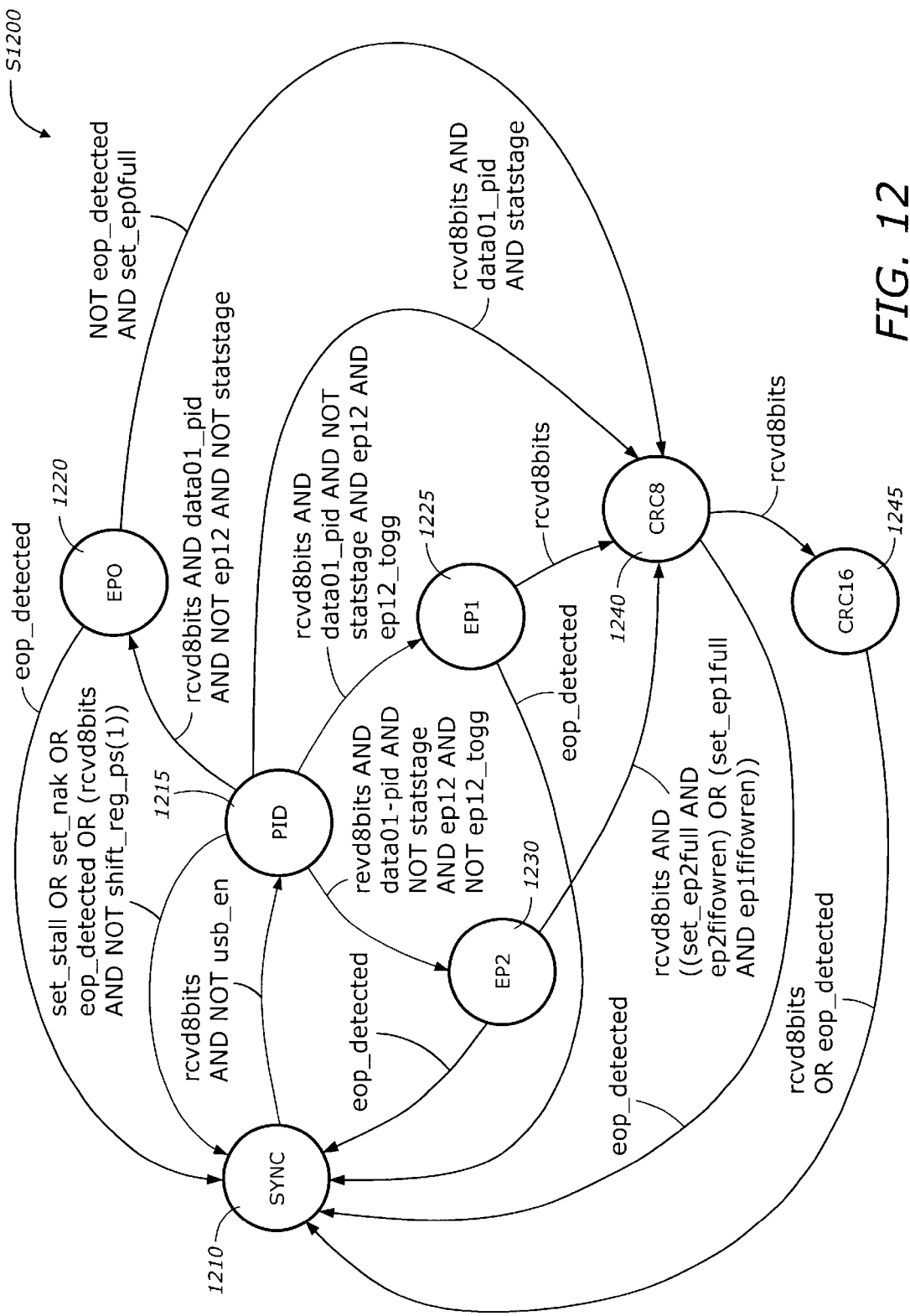
FIG. 12 is a state diagram illustrating the receiver state machine according to one embodiment of the invention.

Receiver State Machine:

FIG. 12 is a state diagram illustrating the receiver state machine according to one embodiment of the present invention. The receiver state machine S1200 includes a SYNC state 1210, a PID state 1215, an EP0 state 1220, an EP1 state 1225, an EP2 state 1230, a CRC8 state 1240, and a CRC16 state 1245.

The state signals in the receiver state machine S1200 are:

set_stall: indicates that the USB camera sends back a STALL PID in response to a request for data (IN). The STALL PID is decoded and stored in the status register.

set_nak: indicates that the USB camera sends back a NACK PID in response to a request for data (IN). The NACK PID is decoded and stored in the status register.

eop_detected: indicates that the received PID is an ACK, i.e., the USB camera has received data and is sending back an acknowledgment.

rcvd8bits: indicates that the receiver has received 8 bits from the USB serial stream.

shift_reg_ps(1): corresponds to the input data shift register. If bit 1 is asserted (set to 1), then the PID receives a PID indicating that the camera should not be sending. In this case, it is preferable to go back to the SYNC state instead of continuing the operation.

ep12_togg: is a pointer that keeps track of the endpoint that should be received next. It is toggled between EP1 and EP2.

set_ep0full: indicates that the 8 byte s of data have been received from the camera and the endpoint 0 full flag is set in the status register.

set_ep1full: indicates that the FIFO in EP1 is full. The second IN command in isochronous mode will be to endpoint 2 which should have the number of bytes specified in the packet size register. When getting data from the camera endpoint 2, the receiver will stay in EP2 state until that number of bytes has been received and the corresponding FIFO is full (by the set_ep1full) and the data is being written (indicated by the corresponding fifowren bit).

ep1fifowren, ep2fifowren: indicate that the corresponding FIFO in EP1 and EP2 are being written for each byte of data.

statstage: indicates that the stage state machine S1000 is in the HAND state.

data01_pid: indicates that the PID received was a DATA0 or DATA1 pid which indicates that the data is being sent.

The state transition equations are given as follows:

| From | To | State transition equation |
|---|---|---|
| SYNC state 1210 | PID state 1215 | rcvd8bits AND NOT usb_en |
| PID state 1215 | SYNC state 1210 | set_stall OR set_nak OR eop_detected OR (rcvd8bits AND NOT shift_reg_ps(1)) |
| | EP0 state 1220 | rcvd8bits AND data01_pid AND NOT ep12 AND NOT statstage |
| | EP1 state 1225 | rcvd8bits AND data01_pid AND NOT statstage AND ep12 AND ep12_togg |
| | EP2 state 1230 | rcvd8bits AND data01_pid AND NOT statstage AND ep12 AND NOT ep12_togg |
| | CRC8 state 1240 | rcvd8bits AND data01_pid AND statstage |
| EP0 state 1220 | SYNC state 1210 | eop_detected |
| | CRC8 state 1240 | NOT eop_detected AND set_ep0full |
| EP1 state 1225 | SYNC state 1210 | eop_detected |
| | CRC8 state 1240 | rcvd8bits |

-continued

| From | To | State transition equation |
|---|---|---|
| EP2 state 1230 | CRC8 state 1240 | rcvd8bits AND ((set_ep2full AND ep2fifowren) OR (set_ep1full AND ep1fifowren)) |
| CRC8 state 1240 | SYNC state 1210 | eop_detected |
|  | CRC16 state 1245 | rcvd8bits |
| CRC16 state 1245 | SYNC state 1210 | rcvd8bits OR eop_detected. |

The above three state machines S1000, S1100, and S1200 show the conversion between the USB commands and the USB cycles. These state machines allow simple commands from the host processor to the parallel port interface device like the SMC34C60 to be converted into the specific USB signals corresponding to the USB cycles. In addition, these state machines also allow the specific USB signals corresponding to the USB cycles to be responded in support of a USB transaction.

The present invention provides an efficient method and apparatus to interface between a serial bus device and a parallel port. This interface includes an efficient management of data flow between the serial bus device and the parallel port, a virtualization of the endpoints through an address space, and a conversion between parallel port commands and the serial bus cycles. The present invention therefore allows a PC system without a serial bus interface to communicate with serial bus devices easily using the parallel port.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method comprising:
   receiving data from a serial bus device at a first data rate via a serial bus;
   writing the received data to a first buffer at the first data rate; and
   reading the received data from a second buffer to a processor via a parallel port device at the second data rate, the second data rate being asynchronous to the first data rate, the first and second buffers being mapped into memory address space of the processor.

2. The method of claim 1 further comprising:
   writing the received data to the second buffer when the first buffer is full; and
   reading the received data from the first buffer when all the received data in the second buffer have been read out.

3. The method of claim 1 further comprising:
   initializing the parallel port device; and
   issuing a command to the parallel port device to input data.

4. The method of claim 1 wherein the first and second buffers are first-in-first-out memories.

5. The method of claim 1 wherein the serial bus is a Universal Serial Bus (USB).

6. A method comprising:
   receiving data from a processor via a parallel port device at the second data rate;
   writing the received data to a first buffer at the second data rate; and
   transferring the received data from a second buffer to a serial bus device at the first data rate, via a serial bus, the first data rate, being asynchronous to the second data rate the first and second buffers being mapped into memory address space of the processor.

7. The method of claim 6 further comprising:
   writing the received data to the second buffer when the first buffer is full; and
   reading the received data from the first buffer when all the received data in the second buffer have been read out.

8. The method of claim 6 before receiving data further comprising:
   initializing the parallel port device; and
   issuing a command to the parallel port device to output data.

9. The method of claim 6 wherein the first and second buffers are first-in-first-out memories.

10. The method of claim 6 wherein the serial bus is a Universal Serial Bus (USB).

11. An apparatus comprising:
    a serial bus receiver for receiving data from a serial bus device at a first data rate via a serial bus; and
    a buffer unit coupled to the serial bus receiver and a parallel port device to store the received data at the first data rate and to transfer the stored data to a processor via the parallel port device at a second data rate, the second data rate being asynchronous to the first data rate, the first and second buffers being mapped into memory address space of the processor.

12. The apparatus of claim 11 further comprising:
    a serial bus port driver coupled to the serial bus device and the serial bus receiver to convert signals from the serial bus device to signals compatible with the serial bus receiver; and
    a parallel port interface coupled to the buffer unit and the parallel port device to convert signals from the parallel port device to signals compatible with the buffer unit.

13. The apparatus of claim 11 wherein the buffer unit further comprises:
    a first buffer coupled to the serial bus receiver and the parallel port device to store the received data at the first data rate; and
    a second buffer coupled to the serial bus receiver and the parallel port device to transfer a previously stored data to the parallel port device while the first buffer is storing the received data.

14. The apparatus of claim 13 wherein the buffer unit further comprises:
    a first address generator coupled to the first buffer to generate addresses to the first buffer;
    a first address comparator coupled to the first address generator to determine a first storage condition of the first buffer;
    a second address generator coupled to the second buffer to generate addresses to the second buffer; and
    a second address comparator coupled to the second address generator to determine a second storage condition of the second buffer.

15. The apparatus of claim 11 further comprising:
    a control unit coupled to the buffer unit and the parallel port device to select data from the buffer unit and to generate control signals.

16. The apparatus of claim 11 wherein the serial bus is a Universal Serial Bus (USB).

17. An apparatus comprising:
a buffer unit to store data from a processor via a parallel port device at a second data rate; and
a serial bus transmitter coupled to the buffer unit to transmit the stored data to a serial bus device via a serial bus at a first data rate, the second data rate being asynchronous to the first data rate, the buffer unit being mapped into memory address space of the processor.

18. The apparatus of claim 17 further comprising:
a serial bus port driver coupled to the serial bus device and the serial bus transmitter to convert signals from the serial bus device to signals compatible with the serial bus transmitter; and
a parallel port interface coupled to the buffer unit and the parallel port device to convert signals from the parallel port device to signals compatible with the buffer unit.

19. The apparatus of claim 17 wherein the buffer unit further comprises:
a first buffer coupled to the serial bus transmitter and the parallel port device to store the transmitted data at the second data rate when not full; and
a second buffer coupled to the serial bus transmitter and the parallel port device to transfer a previously stored data to the parallel port device while the first buffer is storing the transmitted data.

20. The apparatus of claim 19 wherein the buffer unit further comprises:
a first address generator coupled to the first buffer to generate addresses to the first buffer;
a first address comparator coupled to the first address generator to determine a first storage condition of the first buffer;
a second address generator coupled to the second buffer to generate addresses to the second buffer; and
a second address comparator coupled to the second address generator to determine a second storage condition of the second buffer.

21. The apparatus of claim 17 further comprises:
a control unit coupled to the buffer unit and the parallel port device to select data from the buffer unit and to generate control signals.

22. The apparatus of claim 17 wherein the serial bus is a Universal Serial Bus (USB).

23. A system comprising:
a serial bus device operating at a first data rate;
a parallel port device operating at a second data rate asynchronously to the first data rate; and
a serial bus-to-parallel port interface (UPI) circuit comprising:
a serial bus receiver to receive data from the serial bus device at the first data rate via a serial bus,
a serial bus transmitter to transmit data from a processor via the parallel port device at the second data rate, and
a buffer unit coupled to the serial bus receiver, the serial bus transmitter, and the parallel port device (i) to store the received data at the first data rate and to transfer the stored data to the parallel port device at the second data rate, or (ii) to store the data to be transmitted at the second data rate and to transfer the stored data to the serial bus device at the first data rate, the buffer unit being mapped into memory address space of the processor.

24. The system of claim 23 wherein the UPI circuit further comprises:
a serial bus port driver coupled to the serial bus device, the serial bus receiver, and the serial bus transmitter to convert signals from the serial bus device to signals compatible with the serial bus receiver and the serial bus transmitter; and
a parallel port interface coupled to the buffer unit and the parallel port device to convert signals from the parallel port device to signals compatible with the buffer unit.

25. The system of claim 23 wherein the buffer unit further comprises:
a first buffer coupled to the serial bus receiver and the parallel port device to store the received data at the first data rate when not full; and
a second buffer coupled to the serial bus receiver and the parallel port device to transfer the previously stored data to the parallel port device while the first buffer is storing the received data.

26. The system of claim 23 wherein the buffer unit further comprises:
a first buffer coupled to the serial bus transmitter and the parallel port device to store the transmitted data at the second data rate when not full; and
a second buffer coupled to the serial bus transmitter and the parallel port device to transfer the previously stored data to the serial bus device while the first buffer is storing the transmitted data.

27. The system of claim 26 wherein the buffer unit further comprises:
a first address generator coupled to the first buffer to generate addresses to the first buffer;
a first address comparator coupled to the first address generator to determine a first storage condition of the first buffer;
a second address generator coupled to the second buffer to generate addresses to the second buffer; and
a second address comparator coupled to the second address generator to determine a second storage condition of the second buffer.

28. The system of claim 23 wherein the UPI circuit further comprises:
a control unit coupled to the buffer unit and the parallel port device to select data from the buffer unit and to generate control signals.

29. The system of claim 23 wherein the serial bus is a Universal Serial Bus (USB).

* * * * *

UNITED STATES PATENT AND TRADEMARK OFFICE
CERTIFICATE OF CORRECTION

PATENT NO. : 6,256,687 B1
DATED : July 3, 2001
INVENTOR(S) : Ellis et al.

It is certified that error appears in the above-identified patent and that said Letters Patent is hereby corrected as shown below:

Column 5,
Line 24, delete "EPOD", insert -- EP0D --.

Column 13,
Line 17, delete "DATAL", insert -- DATA1 --.

Column 4,
Line 45, FIG. 3, delete part number of PID DECODER "342", insert -- 344 --.

Signed and Sealed this

Thirteenth Day of August, 2002

Attest:

JAMES E. ROGAN
Attesting Officer
Director of the United States Patent and Trademark Office